(12) United States Patent
Burke et al.

(10) Patent No.: US 10,407,527 B2
(45) Date of Patent: Sep. 10, 2019

(54) CHARGE-SHIFTING POLYMERS FOR TISSUE COMPATIBLE HYDROGELS

(71) Applicant: MCMASTER UNIVERSITY, Hamilton (CA)

(72) Inventors: Nicholas Burke, Dundas (CA); Samantha Ros, Brampton (CA); Harald Stover, Dundas (CA)

(73) Assignee: McMaster University, Hamilton, Ontario (CA)

( * ) Notice: Subject to any disclaimer, the term of this patent is extended or adjusted under 35 U.S.C. 154(b) by 223 days.

(21) Appl. No.: 15/172,791

(22) Filed: Jun. 3, 2016

(65) Prior Publication Data

US 2016/0355627 A1 Dec. 8, 2016

Related U.S. Application Data

(60) Provisional application No. 62/170,787, filed on Jun. 4, 2015.

(51) Int. Cl.
| | |
|---|---|
| *C08F 220/60* | (2006.01) |
| *C08L 33/24* | (2006.01) |
| *C08F 220/34* | (2006.01) |
| *C08L 33/14* | (2006.01) |
| *C08F 8/12* | (2006.01) |
| *C08J 3/075* | (2006.01) |
| *C08J 3/12* | (2006.01) |
| *C08J 3/24* | (2006.01) |

(52) U.S. Cl.
CPC .............. *C08F 220/60* (2013.01); *C08F 8/12* (2013.01); *C08F 220/34* (2013.01); *C08J 3/075* (2013.01); *C08J 3/126* (2013.01); *C08J 3/245* (2013.01); *C08L 33/14* (2013.01); *C08L 33/24* (2013.01); *C08F 2438/03* (2013.01); *C08J 2333/14* (2013.01); *C08J 2333/26* (2013.01); *C08J 2433/14* (2013.01); *C08J 2433/26* (2013.01)

(58) Field of Classification Search
CPC .................................................. C08F 220/60
See application file for complete search history.

(56) References Cited

U.S. PATENT DOCUMENTS

| | | | |
|---|---|---|---|
| 8,815,283 B2 | 8/2014 | Stover et al. | |
| 2008/0166409 A1* | 7/2008 | St. John | A61K 9/5138 424/486 |
| 2011/0123446 A1* | 5/2011 | DeSimone | C07F 7/184 424/1.65 |
| 2012/0009242 A1* | 1/2012 | Casey | A61L 15/24 424/446 |
| 2014/0309313 A1* | 10/2014 | Stover | A61K 9/06 514/772.1 |

OTHER PUBLICATIONS

McCool, M.B.—"The Self-Catalysed Hydrolysis of Poly (N,N-Dimethylaminoethyl Acrylate)"; Senogles, E.Eur. Polym.J. 1989, 25, pp. 857-860.
Truong, N.P.; Jia, Z.;Burges, M.; McMillan, N.A.J.; Monteira, M.J.—"Self-Catalyzed Degradation of Linear Cationic Poly(2-dimethylaminoethyl acrylate) in Water"; Biomacromolecules 2011, 12, pp. 1876-1882.
Tran et al.: "Time-Release Polymer Nanoparticles"; Biomacromolecules 2013,14, pp. 495-502.
Tran et al.: "Fine Tuning the Disassembly Time of Thermoresponsive Polymer Nanoparticles"—Biomacromolecules 2013, 14, pp. 3463-3471.
Liu et al.: "Charge-Shifting Cationic Polymers That Promote Self-Assembly and Self-disassembly with DNA"—Macromolecules 2005, 38, pp. 7907-7914.
Zhang J.; Lynn, D.M. : "Ultrathin Multilayered Films Assembled from "Charge-Shifting" Cationic Polymers: Extended, Long-Term Release of Plasmid DNA from Surfaces"—Adv. Mater. 2007, 19, pp. 4218-4223.
Sinclair et al.: "Engineering Buffering and Hydrolytic or Photolabile Charge Shifting in a Polycarboxybetaine Ester Gene Delivery Platform"—Biomacromolecules 2013, 14, pp. 1587-1593.
Gardner et al.: "Improving Covalent Cell Encapsulation with Temporarily Reactive Polyelectrolytes"—J. Mater. Sci. Mater. Med. 2012, 23, pp. 181-193.
Chung et al.: "Tetrakis(hydroxymethyl) Phosphonium Chloride as a Covalent Cross-Linking Agent for Cell Encapsulation within Protein-Based Hydrogels"—Biomacromolecules 2012, 13, pp. 3912-3916.

* cited by examiner

Primary Examiner — Michael F Pepitone
(74) Attorney, Agent, or Firm — Gowling WLG (Canada) LLP

(57) ABSTRACT

A novel charge-shifting copolymer is provided comprising a first charge-shifting monomer that is cationic under physiological conditions and which possesses cationic groups that may be converted into anionic groups under physiological conditions, a second monomer comprising at least one primary amine that is not convertible to an anionic group under physiological conditions, and optionally, one or more monomers which are polar uncharged monomers. A hydrogel system incorporating this copolymer, as well as a capsule system, are also provided.

13 Claims, 14 Drawing Sheets

CHARGE-SHIFTING POLYMERS FOR TISSUE COMPATIBLE HYDROGELS

FIELD OF THE INVENTION

The present invention generally relates to immune-compatible polymer systems useful for cell encapsulation

BACKGROUND OF THE INVENTION

Polyelectrolytes have been used extensively in biomaterials as the electrostatic interaction of oppositely charged polymers allow for their self-assembly into various polyelectrolyte complexes.[1,2] However, high charge density polyelectrolytes, in particular polycations, sometimes show poor biocompatibility due to protein binding and cytotoxicity. The standard alginate-poly(L-lysine)-alginate (APA) capsule, composed of calcium alginate cores coated with poly(L-lysine) (PLL) and a final alginate layer, for encapsulation and immuno-isolation of mammalian cells as an approach to cell-based therapies for enzyme and hormone deficiency disorders, has shown issues with mechanical stability and biocompatibility.[3,4] As the APA capsule is held together solely by electrostatic interactions (Ca-alginate and alginate-PLL), its long-term stability in vivo can be compromised by processes such as exchange of calcium for sodium in the serum.[5] Although the high-charge density poly(L-lysine) (PLL) allows for strong electrostatic complexation with alginate, it is desirable to covalently crosslink the polyelectrolyte complex to ensure long-term stability of the capsule shell. In addition, it can be advantageous to hide the PLL on the capsule surface to avoid adverse immune responses including cellular overgrowth triggered by cationic patches and hydrophobic complexes.[6,7]

One approach has been to use temporarily reactive polyanions (TRPs) that can a) form a 1:1 charge complex with, e.g., PLL coated onto calcium alginate, b) form permanent covalent crosslinks (amide linkages) by reaction of electrophilic units with amines on the polycation and e) undergo hydrolysis of residual electrophilic units to give an overall anionic charge to the complex.[7,8]

While PLL has been shown to be suitable for this process, attempts have been made to reduce the detrimental effects of such high-charge density polycations in biomaterial applications. These include design and synthesis of copolymers combining cationic monomers with neutral, polar[9] or anionic[10] comonomers, grafting poly(ethylene glycol) chains onto PLL,[11,12] and cross-linking alginate-PLL capsules with tosylated poly(vinyl alcohol).[13]

Many of these charge-reduced polycations suffer from relatively weak electrostatic binding to the calcium alginate cores. Thus, a polymer with a high cationic charge density, able to form strong polyelectrolyte complexes with alginate, is needed for initial deposition, though a mechanism of cationic charge reduction is desirable for host-compatibility of the final hydrogel.

There has been recent interest in polyelectrolytes able to reduce or switch the charge on a polymer chain, a process that typically occurs by hydrolysis. These polymers, often called "charge-shifting", "charge-reversing" or "charge-conversion" polymers, are of particular interest for biomaterial applications where the high initial charge allows them to be self-assembled as polyelectrolyte complexes and then disassembled once the charge has reversed or shifted.[14-16] It was first reported by McCool and Senogles that poly(N,N-dimethylaminoethyl acrylate), p(DMAEA), undergoes a self-catalyzed hydrolysis in water to form acrylic acid (AA) units and N,N-dimethylaminoethanol (DMAE) as a by-product.[17] More recently, Monteiro et al. explored the preparation and hydrolysis (charge-shifting) of various DMAEA-containing polymers with potential applications as DNA or siRNA delivery devices.[18-20]

It would be desirable to develop novel immune-compatible polymer systems useful for cell encapsulation.

SUMMARY OF THE INVENTION

In this work, a novel charge-shifting copolymer has been developed to replace high charge density polycations such as poly-L-lysine (PLL) or poly(aminopropylmethacrylamide) (poly(APM)) in applications involving a temporary need for strong electrostatic complexation with polyanions.

Thus, in one aspect of the invention a charge-shifting copolymer is provided comprising a first monomer that is cationic under physiological conditions and which possesses cationic groups that may be converted into anionic groups under physiological conditions, a second monomer comprising at least one primary amine group that is not convertible to an anionic group under physiological conditions, and optionally, one or more monomers which are polar but uncharged.

In another aspect of the invention, a hydrogel system is provided comprising a hydrogel core and a copolymer surrounding and/or dispersed within the hydrogel core, wherein the copolymer comprises a first monomer that is cationic under physiological conditions and which possesses cationic groups that may be converted into anionic groups under physiological conditions, a second monomer comprising at least one primary amine group that is not convertible to an anionic group under physiological conditions, and optionally, one or more monomers which are polar but uncharged.

In another aspect, a method of making an immunocompatible hydrogel system is provided. The method comprises the steps of:

i) exposing a hydrogel to an aqueous solution comprising a charge-shifting copolymer comprising a first monomer that is cationic under physiological conditions and which possesses cationic groups that may be converted into anionic groups under physiological conditions, a second monomer comprising at least one primary amine that is not convertible to an anionic group under physiological conditions, and optionally, one or more monomers which are polar but uncharged; and ii) exposing the hydrogel to conditions that result in conversion of the cationic groups on the first monomer to anionic groups.

DETAILED DESCRIPTION

Figure 1:
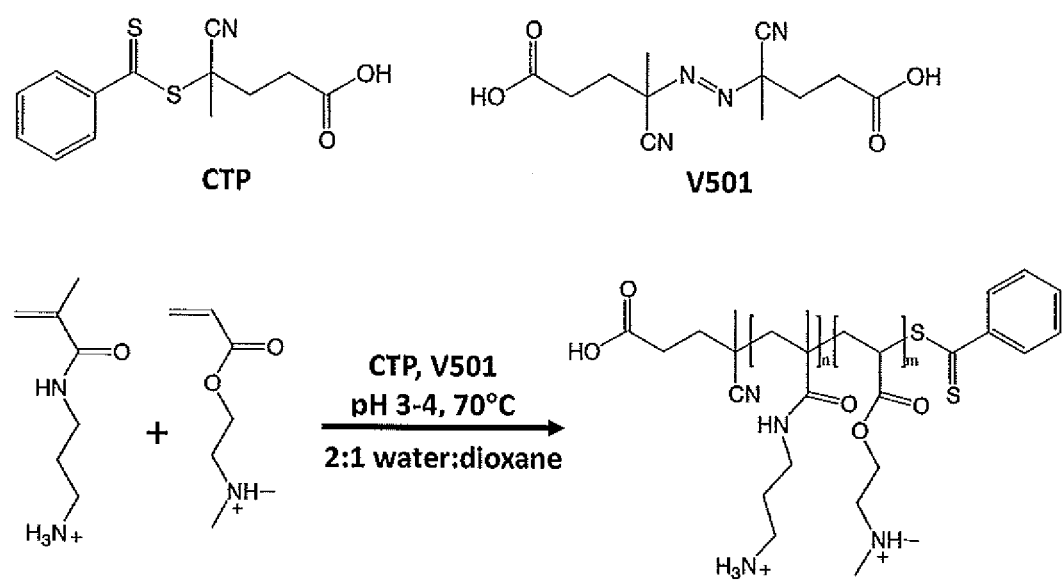
FIG. 1 shows a reaction scheme for RAFT copolymerization of APM and DMAEA.

A charge-shifting copolymer is provided comprising a first monomer that is cationic under physiological conditions and which possesses cationic groups that may be converted into anionic groups under physiological conditions, a second monomer comprising at least one primary amine that is not convertible to an anionic group under physiological conditions, and optionally, one or more monomers which are polar but uncharged.

The first monomer may be any monomer comprising cationic groups under physiological conditions which are convertible under physiological conditions, e.g. physiological pH (pH 6.5-7.5) and 37° C., to anionic groups, i.e. charge-shifting monomers. For example, in one embodiment, the cationic groups of the first monomer may be converted to anionic groups by hydrolysis to reduce the net cationic charge of the charge-shifting copolymer, and preferably, to convert the charge-shifting copolymer to a net neutral or net negative charge. It is preferred that the charge-shifting monomers are able to convert within the copolymer within a short period of time under physiological conditions. Thus, in one embodiment, at least 25% of the charge-shifting monomer units hydrolyze within 5 days or less under physiological conditions, e.g. 3-4 days or less.

Examples of suitable charge-shifting monomers include, but are not limited to, 2-(N,N-dimethylamino)ethyl acrylate (DMAEA), 2-(N,N-diethylamino)ethyl acrylate (DEAEA), 3-(N,N-diethylamino)propyl acrylate (DMAPA), 3-(N,N-dimethylamino)propyl thiomethacrylate and related monomers.

The second monomer is a primary amine-containing monomer in which the primary amine is not charge-shifting, i.e. does not convert from a cation to an anion under physiological conditions. Examples of suitable second monomers include, but are not limited to, 3-aminopropylmethacrylamide (APM), 3-aminopropylacrylamide (APA), 2-aminoethylmethacrylamide (AEM), 2-aminoethylacrylamide (AEA), 4-aminobutylacrylamide (ABA) or similar acrylamide or methacrylamide monomers bearing a primary amine group. Other examples include 3-aminopropyl methacrylate and 2-aminoethylmethacrylate and other primary amine-bearing methacrylate monomers.

The charge-shifting copolymer may also optionally include one or more polar uncharged monomers. Examples of suitable such monomers include, but are not limited to, acrylamide, N,N-dimethylacrylamide (DMA), N-(2-hydroxyethyl)acrylamide (HEA), N-(2-hydroxypropyl)methacrylamide (HPM), 3-amino-2-hydroxypropyl-methacrylate, glycerol methacrylate, poly(ethylene glycol) methacrylate and related monomers.

The charge-shifting copolymer of the invention may be made by conventional radical copolymerization of monomers. Generally, the first and second monomers are combined with heating in an aqueous solution at an acidic pH, e.g. a pH of less than 5.0 such as a pH of 4.5 or less, preferably a pH in the range of 3-4, in the presence of a suitable polymerization initiator, e.g. peroxide initiators such as potassium persulfate or water-soluble azo initiators such as Vazo-56. Alternatively, other means of initiating polymerization may be utilized as is known in the art including photochemical initiation, redox initiation, and initiation by ionizing radiation such as the gamma-radiation produced by a $^{60}$Co source.

The charge-shifting copolymer may also be produced by reversible addition-fragmentation chain transfer polymerization (RAFT). In this case, the second amine-containing monomer is combined with a polymerization initiator and a RAFT agent, such as a trithiocarbamate, a dithiocarbamate or a dithiobenzoate, in an aqueous solvent at an acidic pH to form a solution. The solution is cooled while the first charge-shifting monomer is added, and then heated to promote polymerization.

The amounts of first and second monomer in the charge-shifting copolymer may vary, depending on the desired characteristics of the copolymer. Generally, the charge-shifting copolymer of the present invention will comprise a suitable ratio of first charge-shifting monomer to second amine-containing monomer to permit sufficient reduction in cationic charge to render the copolymer to be immunocompatible. Thus, the copolymer may comprise between about 10 and 95 mol %, and preferably between 25 and 90 mol %, of the first charge-shifting monomer. The remainder of the copolymer (i.e. 5-90 mol %) may solely comprise the second primary amine-containing monomer, or may optionally comprise a mixture of primary amine-containing monomer and polar neutral monomer. Polar neutral monomer may be present in the copolymer in an amount ranging from 5-50%.

The molecular weight of the charge-shifting copolymer may also vary depending on the desired characteristics thereof. Thus, the copolymer may have a molecular weight in the range of about 5-100 kDa, and preferably in the range of about 10-50 kDa.

In another aspect of the invention, a hydrogel system is provided comprising a hydrogel core and a charge-shifting copolymer surrounding and/or dispersed within the hydrogel core.

The term "hydrogel" generally refers to water soluble polymer systems capable of being gelled using biocompatible means such as divalent cation binding and thermal gelation. Examples of hydrogels that are suitable for use in the present hydrogel system include, but are not limited to, calcium alginate, strontium alginate, barium alginate, agarose and high viscosity gel-forming polymers such as cellulose sulphate which may be used instead of alginate, or together with alginate, as described in Prokop et al. (Adv Polym Sci 1998, 136, 1-51 and 53-73), the contents of which are incorporated herein by reference. Ionic gelling agents suitable for this purpose include calcium chloride, strontium chloride or barium chloride.

Thus, the hydrogel of the present hydrogel system may be prepared using a water soluble polymer capable of being gelled using biocompatible means such as divalent cation binding, for example, calcium alginate, strontium alginate and barium alginate, and thermal gelation.

The resulting hydrogel may then be coated or admixed with a charge-shifting copolymer. The amount of charge-shifting copolymer combined with the hydrogel will depend on the desired characteristics of the hydrogel system, as well as the characteristics of the charge-shifting copolymer. Generally, the ratio of hydrogel to charge-shifting copolymer used in the formation of the hydrogel system will be in the range of about 1:1 to 100:1, with ratios close to 1:1 being used when it is desired to fill the hydrogel core with comparable amounts of the charge-shifting copolymer, and ratios close to 100:1 being used when it is desired to coat the charge-shifting copolymer onto a preformed hydrogel core.

To provide a hydrogel system for use as an immunocompatible delivery system, the charge-shifting copolymer utilized will preferably possess a molecular weight of at least about 10 kDa, and preferably a molecular weight of 20, 30, 40, 50 or more kDa, to provide a strong coating on the hydrogel that is resist to mechanical and other stresses. In addition, use of a charge-shifting copolymer having, a content of at least about 25% charge-shifting monomer (first monomer), and preferably, at least about 40, 50, 60, 70, 75, 80 or 90% charge-shifting monomer, will provide a hydrogel system that exhibits effective immunocompatibility, e.g. which possesses a reduced net cationic charge density compared to the charge-shifting copolymer prior to conversion (charge-shifting), due to both the loss of cationic groups (e.g. amine cations) and the generation of corresponding anionic groups (e.g. carboxylic acid anions). Not including the optional presence of neutral comonomers, ratios of cationic to anionic groups after charge-shifting may be reduced from ratios in which cationic to anionic groups is greater than 75:25 to ratios of approximately 75:25, 50:50, or more preferably, to ratios of about 25:75 or 10:90. Thus, following charge-shifting, net charge of the charge-shifting copolymer may be cationic, but the cationic charge is reduced by at least about 10% or more from the cationic charge of the copolymer prior to charge-shifting. It is preferred that the net cationic charge of the copolymer following charge-shifting be reduced by more than 10%, e.g. by 20%, 30%, 40%, 50% or greater. Most preferred is a net neutral or net anionic charge of the charge-shifting copolymer following charge-shifting.

Following coating of the hydrogel with the charge-shifting copolymer, the charge-shifting copolymer is then exposed to conditions which promote charge-shifting and conversion of cationic groups to anionic groups, e.g. hydrolysis under physiological conditions.

The charge-shifting copolymer may also be covalently cross-linked to the hydrogel core to further strengthen and enhance the mechanical properties of the hydrogel system using a suitable cross-linking agent such as an electrophilic polymer (reactive polyanion) or a small molecule cross-linking agent. In this regard, it is preferred that a physiologically acceptable (e.g. cytocompatible) crosslinking agent be used. Examples of suitable cross-linking agents include, but are not limited to, electrophilic polymers such as copolymers of 4,4-dimethyl-2-vinylazlactone with anionic monomers such as acrylic acid or methacrylic acid, or with amphiphilic polar monomers such as 2-methacryloxyethyl phosphorylcholine (MPG), or small molecules such as tetrakishydroxymethyl phosphonium chloride (THPC), glutaraldehyde and related di-aldehydes, and genipin. The amount of cross-linking agent used will generally be an amount in excess of the groups to be covalently cross-linked.

Cross-linking within the charge-shifting copolymer, e.g. self-crosslinking, may also be promoted under suitable conditions. For example, in an aqueous environment primary amine groups on one charge-shifting copolymer may react with a reactive group (e.g. an ester) on another charge-shifting copolymer to form a covalent crosslink.

The term "covalently crosslinked" as used herein to refer to the formation of covalent bonds between reactive polymers which are stable in the presence of an ionic solution (e.g. a sodium chloride solution at a concentration of about 1-2 M), or at high pH levels, e.g. pH 12-13, such as in the presence of 0.1 N sodium hydroxide. This is in contrast to electrostatic interactions which are commonly labile in the presence of such ionic solutions, and at high pH.

The present hydrogel system is advantageously immuno-compatible. The term "immuno-compatible" refers to hydrogel systems which do not induce a significant immune response on administration to a host, e.g. hydrogel systems that exhibit reduced binding with endogenous host proteins. Thus, the present hydrogel system essentially lacks protein-binding sites, e.g. reactive sites or regions of high local cationic charge density capable of binding with surrounding proteins, within the hydrogel system. This is due to charge-shifting within the charge-shifting copolymer to result in a reduced cationic charge in the copolymer, for example, a net neutral or anionic charge which is resistant to undesirable protein binding that could otherwise cause or contribute to a deleterious immune response to the hydrogel on transplant. The term "lacks" or "essentially lacks" is used herein to mean that the polymer matrix exhibits a negligible or insignificant amount of protein binding sites.

Embodiments of the invention are described by reference to the following specific examples which are not to be construed as limiting.

EXAMPLES

Materials:
N-(3-Aminopropyl)methacrylamide (APM) hydrochloride was purchased from PolySciences and was used as received, 2-(N,N-dimethylamino)ethyl acrylate (DMAEA) (98%), 2,2'-azobis(2-methylpropionamidine) dihydrochloride (Vazo-56), 4-cyano-4(phenylcarbonothioylthio) pentanoic acid (≥98%), 4,4-azobis(4-cyanovaleric acid) (>97%), tetrakis(hydroxymethyl) phosphonium chloride (80 wt. % in water), fluorescein isothiocyanate isomer I (FITC, ≥90%), deuterium chloride (DCI, 35% in $D_2O$, 99% D), N,N-dimethylformamide (≥98%) and tetrakis(hydroxymethyl)phosphonium chloride (THPC) were purchased from Sigma-Aldrich and used as received unless otherwise stated. DMSO-D6 (99.9% D), MeOD-$D_4$ (99.8% D), and $D_2O$ (99.9% D) from Cambridge Isotope Laboratories Inc., 1,4-Dioxane (≥99%) from Caledon Laboratories, basic alumina (activity I) from Fisher Scientific and sodium alginate (Pronova UP MVG, 69% G, BP-1105-06) from Nova Matrix were used as received.

Reactivity Ratio Determination of APM and DMAEA:

Copolymerizations of APM and DMAEA were conducted within a 500 MHz Bruker Avance spectrometer and followed by $^1$H NMR spectroscopy. Solutions of APM and DMAEA at 10% w/v total monomer loading with 1 mol % Vazo-56 in $D_2O$, with initial feed ratios of 20:80, 25:75, 50:50, 60:40, 75:25, and 90:10 mol % were prepared. The pH of the polymerization solutions was adjusted to 3-4 with 1 M DCl to ensure that APM and DMAEA were protonated and to prevent premature hydrolysis of the DMAEA units. The solutions were transferred to 5 mm NMR tubes and placed in the NMR instrument. The reaction mixtures were rapidly heated to 55° C., following which spectra were collected every minute. The vinyl signals of APM and DMAEA monomers were integrated with respect to the signal at 3.94 ppm, which represents the methylene protons adjacent to the amine of DMAEA in both monomer and polymer and remains constant throughout the polymerization. The amount of each monomer consumed in small conversion steps (5-10%) throughout copolymerization was calculated from the $^1$H NMR data. The reactivity ratios were calculated both by the Fineman-Ross method,[25] and by fitting the (Mayo-Lewis) instantaneous copolymer composition equation to the incremental comonomer conversion data using the least squares method with the Solver tool in Microsoft Excel.

Preparative Conventional Radical Copolymerization of APM and DMAEA:

Copolymers of APM and DMAEA were synthesized in $H_2O$ at pH 3-4 with 10% w/v total monomer loading using 1 mol % Vazo-56 initiator. The molar feed ratios of APM:DMAEA were 0:100, 10:90, 15:85, 50:50, and 75:25 targeting $PAD_{100}$, $PAD_{85}$, $PAD_{75}$, $PAD_{50}$, and $PAD_{25}$, respectively, where the subscript denotes the DMAEA content. The preparation of $PAD_{50}$ is provided as an example. APM (0.555 g, 3.11 mmol) and Vazo-56 (16.9 mg, 0.062 mmol) were dissolved in a mixture of 6.9 mL deionized water and 3.1 mL of 1 M HCl (3.1 mmol) before DMAEA (0.445 g, 3.11 mmol) was added. The pH was adjusted to 3.45 using 1 M NaOH. The reaction mixture, in a 20 mL vial equipped with a septum, was heated in a water bath at 55° C. for 90 min. The polymerization was followed by $^1$H NMR spectroscopy by taking 0.3 mL aliquots at 30 min intervals with a syringe purged with nitrogen, and then diluting the aliquot with $D_2O$ prior to analysis. The polymerizations typically reached about 70% overall conversion after 90 min of heating.

The polymer was purified by dialysis in cellulose tubing (Spectrum Laboratories; 3.5 kDa MW cutoff) with water at pH 3 replaced twice per day until the dialysate showed no absorbance due to monomers or other small molecules with UV-vis spectroscopy, typically after three days. The dialyzed polymer solution was freeze-dried, resulting in $PAD_{50}$ in the hydrochloride form as a white solid. Polymers were analyzed by $^1$H NMR spectroscopy using a Bruker AV 600 spectrometer to determine copolymer composition. Gel permeation chromatography (GPC) was performed with a Waters GPC consisting of a 717plus auto sampler, 515 HPLC pump, Ultrahydrogel (120, 250, 500) columns (30 cm×7.8 mm (i.d.); 6 μm particles), and a 2414 refractive index detector, using a 1 M acetate buffer (pH 4.8) with flow rate of 0.8 mL/min at 30° C. as the mobile phase. The GPC system was calibrated with poly(ethylene glycol) (PEG) standards (Waters Inc.) ranging in molecular weight from 106 Da to 584 kDa.

Reversible Addition-Fragmentation Chain Transfer (RAFT) Polymerization of APM and DMAEA:

RAFT copolymerization of APM and DMAEA was conducted using a 5:1 mol ratio of RAFT agent (4-cyano-4-(phenylcarbonothioylthio) pentanoic acid) (CTP) to initiator 4,4-azobis(4-cyanovaleric acid) (V501) as shown in FIG. 1. DMAEA was passed neat through a basic alumina (activity I) plug to remove the inhibitor and was used immediately after purification. The reactions were carried out with 30% w/v total monomer loading in a 2:1 water:1,4-dioxane solvent mixture with one equivalent of HCl to protonate DMAEA and prevent hydrolysis during copolymerization. The reaction mixture was placed in an ice-water bath before DMAEA addition to limit heating due to neutralization. Exploratory reactions were conducted with 0.9 g total monomer in 3 mL of solvent and aliquots (~200 μL) were taken from the polymerization mixture at various intervals with a $N_2$-purged syringe. A fraction of each aliquot was diluted with $D_2O$ and then analyzed with $^1$H NMR spectroscopy (600 MHz) to determine conversion. The remainder of each aliquot was diluted with GPC mobile phase (1 M acetate buffer) and analyzed by GPC as described above to estimate $M_n$ and polydispersity. Preparative copolymerizations employed 1.8 g of total monomer in 6 mL of solvent and aliquots were taken less frequently to ensure a targeted conversion of about 80%.

The preparative RAFT copolymerization targeting $PAD_{50}$ with MW of 8 kDa is given as an example. In a 20 mL glass vial, APM (0.910 g, 5.09 mmol), CTP (54.6 mg; 0.196 mmol), V501 (11.0 mg; 0.0391 mmol) were dissolved in 6 mL of solvent consisting of 2.00 mL 1,4-dioxane, 2.96 mL water and 1.04 mL of 6 M HCl (6.22 mmol). The solution was cooled in an ice bath as DMAEA (0.891 g; 6.22 mmol) was added. The vial containing the transparent pink reaction mixture was fitted with a septum and the solution was purged for 45 min with $N_2$ gas while stirring at room temperature. The vial was placed in a 70° C. oil bath with the reaction mixture kept under positive $N_2$ pressure while being stirred. When the conversion had reached about 80%, the solution was cooled in an ice bath and exposed to air to halt polymerization. The polymerization mixture was dialyzed and then freeze-dried as described above resulting in $PAD_{50}$ (HCl form) as a pink solid. Preparative reactions targeting $PAD_{25}$, $PAD_{50}$, and $PAD_{75}$ with MWs of 8 and 30 kDa were conducted by RAFT polymerization in a similar fashion.

Measured $M_n$ values were compared to theoretical values ($M_{n,th}$) obtained from eq. (1), where $[m]_i$ and $[CTP]_i$ are the initial concentrations of the monomer and chain-transfer agent, $M_{m^*}$ is the average monomer MW and $M_{CTP}$ is the MW of the chain-transfer agent.

$$M_{n,th} = \text{conversion} \times \left(\frac{[m]_i}{[CTP]}\right) \times M_{m^*} + M_{CTP} \quad (1)$$

Rate of Hydrolysis of PAD by $^1$H NMR Spectroscopy:

The rate of hydrolysis of DMAEA units within $PAD_{100}$, $PAD_{88}$, $PAD_{74}$, $PAD_{43}$, and $PAD_{24}$ was monitored by $^1$H NMR spectroscopy (600 MHz). The polymers were dissolved at a concentration of 0.5 or 1% w/v in $D_2O$ buffered with 50 or 100 mM acetate (pH 5), phosphate (pH 7) or borate (pH 9) buffers. In most cases, the solution pH was measured and adjusted if necessary. The solutions were transferred to NMR tubes, which were maintained at room temperature or 37° C. At various time intervals, $^1$H NMR spectra were obtained and the solution pH was measured.

The percent hydrolysis of DMAEA was determined by comparing the area of the peaks at 3.9 and 4.5 ppm corresponding to the $CH_2O$ methylene protons in DMAE (hydrolysis by-product) and DMAEA units, respectively.

Fluorescent Labeling of PAD:

PAD polymers were fluorescently labeled using FITC with a targeted degree of labeling of 1 mol % (relative to total monomer units). The labeling of $PAD_{50}$ is provided as an example. A solution of $PAD_{50}$ (100 mg or 0.622 mmol monomer units) in 10 mL water was adjusted to pH 7.5 before the addition of 240 µL of a 1% w/v solution of FITC in DMF (2.4 mg; 6.2 µmol). The mixture was stirred at room temperature for 1 h before the pH was adjusted to pH 3 with 1 M HCl. The sample was purified by dialysis as described above except that dialysis was carried out for only 1 day. The polymer was isolated by freeze-drying as a yellow solid and stored in the dark. UV-vis analysis showed that the labeling degree was about 1% for all PAD-f samples.

Preparation of Calcium Alginate Beads:

Calcium alginate beads were prepared as reported previously.[26] Briefly, 5 mL of 1% w/v sodium alginate in saline was syringe filtered (0.2 µm) and then extruded through a 27-gauge needle at 0.5 mL/min using a syringe pump into 60 mL of a 100 mM $CaCl_2$, 77 mM NaCl gelling bath solution. The needle passed through an orifice (~1.2 mm dia.) and the droplet size, and hence bead size, was controlled using an annular airflow of 3.6 L/min, providing an airspeed near the needle tip of about 60 m/s. The calcium alginate beads were isolated from the gelling bath 15 min after bead formation was complete and were stored in a 3.3-fold volume of saline (e.g., 3 mL beads to 10 mL saline). The average diameter of the resulting calcium alginate beads was 500±23 µm (n=88) measured using optical microscopy.

Coating Calcium Alginate Beads with PAD:

Calcium alginate beads were coated with PAD-f in a procedure similar to those previously reported for other polycations.[26] Settled calcium alginate beads (0.3 mL) were coated with PAD by adding 1 mL of 0.1% w/v PAD in 35 mM 4-(2-hydroxyethyl)-1-piperazineethanesulfonic acid (HEPES)-buffered saline at pH 7.8 and occasionally agitating for 6 min. The supernatant was removed and the resulting coated beads (A-$PAD_x$) were washed once with 1 mL of 100 mM $CaCl_2$, 77 mM NaCl gelling bath solution, followed by 1 mL of saline with each wash taking 2 min. The capsules were then stored in 1 mL of 35 mM HEPES-buffered saline at pH 7.8 in the absence of light at 22° C.

Cross-Linking of A-$PAD_{76}$-30k-f-Coated Capsules with THPC:

A dense suspension of calcium alginate beads (0.3 mL) that had been coated with $PAD_{76}$-30k-f were exposed to 1 mL of 0.1% THPC in 35 mM HEPES-buffered saline for 2 min, then washed once with 1 mL of saline for 2 min. The capsules were stored in 1 mL of the HEPES-buffered saline (pH 7.8) at 22° C. in the dark.

Microscopy of Calcium Alginate Beads and Capsules:

Calcium alginate beads, uncoated and PAD-f-coated, were examined by conventional and fluorescence microscopy with a Nikon Eclipse LV100ND optical microscope equipped with an Andor Zyla sCMOS camera and Nikon Elements software, as well as by Confocal Laser Scanning Microscopy (CLSM) using a Nikon A1 Confocal Eclipse Ti microscope with Nikon Elements software. Images of the capsules on Day 0 were taken immediately after coating. Line profiles of the fluorescence intensity of cross-sectional images of the capsules were obtained using Nikon Elements software and the thickness of the capsule membranes was determined by the full-width at half-height.

Sodium Citrate and Sodium Hydroxide Test for A-PAD-f Complex Integrity:

A droplet of HEPES-buffered saline containing A-PAD-f capsules was placed on a glass slide and a few drops of 50 mM sodium citrate was added to the capsules and gently agitated for about one minute. The supernatant was removed from the capsules on the glass slide and a few drops of 0.1 M sodium hydroxide was added. The capsules were monitored during this process by conventional fluorescence microscopy.

Results and Discussion

Copolymerization of APM and DMAEA:

Since DMAEA is susceptible to hydrolysis or nucleophilic attack, it was important to find polymerization conditions under which both the monomer and polymer were stable. DMAEA has been (co)polymerized in organic solvents such as dioxane,[18,27] acetonitrile[28] or isopropanol[29] in which it is stable. However, APM, which must be used as the hydrochloride salt to avoid reaction with DMAEA, is not soluble in these solvents and is typically polymerized in aqueous solvents or methanol (MeOH).

Figure 2:
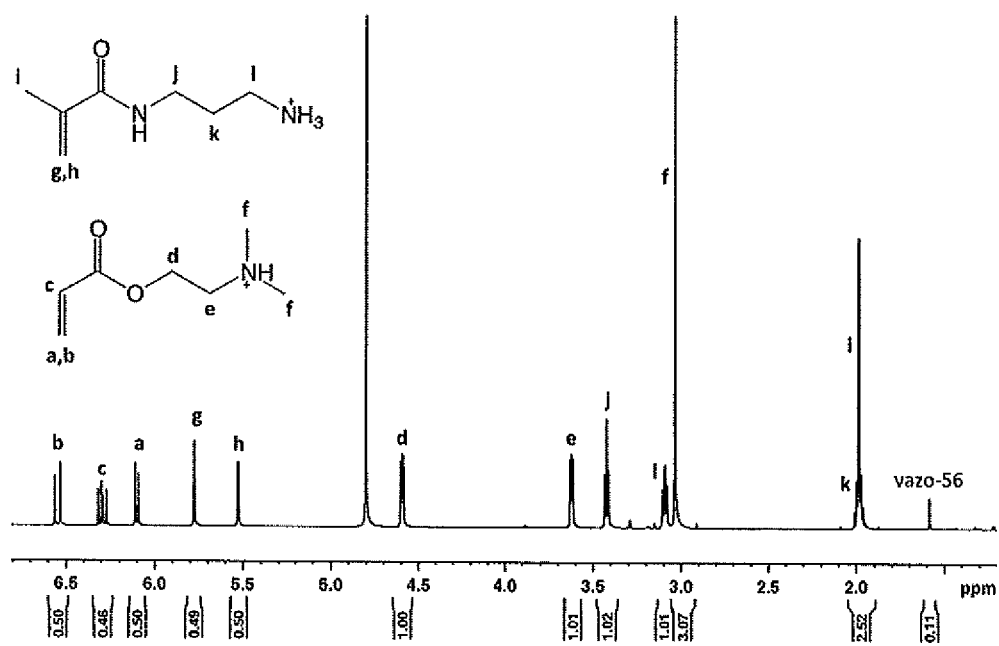
FIG. 2 shows a $^1$H NMR spectrum of a 50:50 mixture of DMAEA and APM with Vazo-56 initiator at pH 3-4 in $D_2O$.

When MeOH was employed, $^1$H NMR spectroscopy revealed that a fairly rapid trans-esterification was occurring between DMAEA and MeOH, likely facilitated by the presence of free amine. In an effort to prevent base-catalyzed nucleophilic attack on the ester group, copolymerization using the protonated form of DMAEA was conducted. When the APM-DMAEA copolymerization was repeated in water containing 1 eq of HCl relative to DMAEA (solution pH~3), polymerization occurred with little or no hydrolysis as shown in FIG. 2. All subsequent copolymerizations were conducted in aqueous solvents under conditions where both monomers were protonated (pH 3-4).

Reactivity Ratios:

The copolymer of APM and DMAEA has not been reported in the literature to date so the copolymerization was investigated in more detail. A series of copolymerizations with different APM-DMAEA ratios (20:80, 25:75, 50:50, 60:40, 75:25, and 90:10) were examined and monomer consumption was followed in situ by $^1$H NMR spectroscopy similar to experiments described by Aguilar et al.[30] The amounts of each monomer consumed in small steps in monomer conversion (5-10%) were determined, with the residual monomers present at the end of one step serving as the starting monomer mix for the next small step in conversion. In this way, it was possible to get a set of data points (monomer feed ratio, copolymer composition) from each copolymerization.

Figure 3:
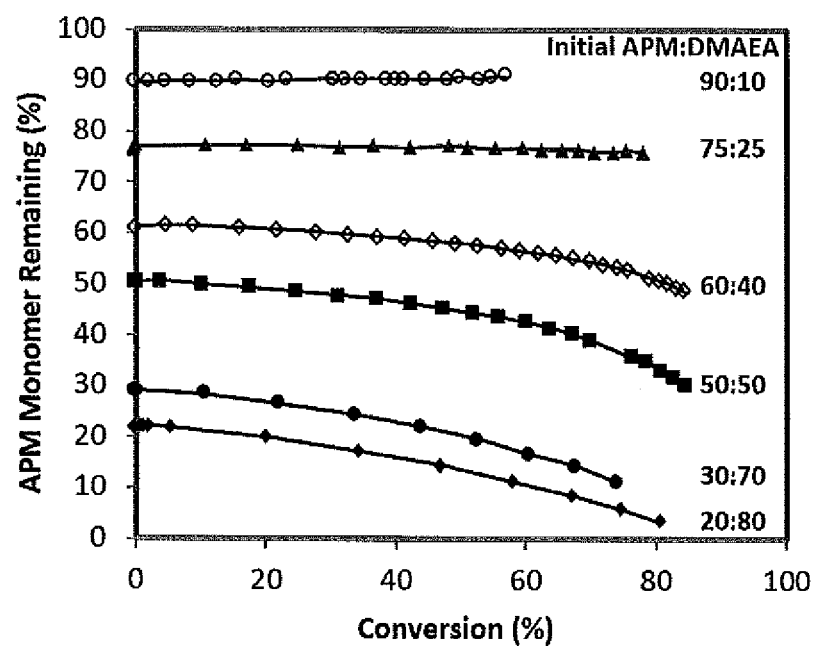
FIG. 3 shows consumption of APM throughout the copolymerization for various feed ratios of APM and DMAEA.

The composition of the residual monomer with conversion for various feed ratios of APM and DMAEA is shown in FIG. 3. There is a slight preference for APM incorporation except for monomer mixtures with high APM content, where the comonomers are incorporated in the feed ratio. The data obtained from these copolymerizations is summarized in Table 1.

TABLE 1

Monomer feed ratios (f1) and polymer compositions (F1) obtained from monitoring APM and DMAEA copolymerizations in situ by $^1$H NMR spectroscopy and F1 calculated from least-squares best-fit of copolymer equation. (DMAEA monomer 1, APM monomer 2).

| f1 (monomer feed) | F1 (polymer composition) | F1 calculated | f1 (monomer feed) (continued) | F1 (polymer composition) (continued) | F1 calculated (continued) |
|---|---|---|---|---|---|
| 0.780 | 0.669 | 0.651 | 0.401 | 0.344 | 0.350 |
| 0.800 | 0.677 | 0.672 | 0.415 | 0.360 | 0.360 |
| 0.827 | 0.711 | 0.702 | 0.428 | 0.365 | 0.370 |
| 0.855 | 0.732 | 0.736 | 0.450 | 0.386 | 0.385 |
| 0.887 | 0.793 | 0.781 | 0.472 | 0.399 | 0.401 |
| 0.914 | 0.823 | 0.822 | 0.0999 | 0.101 | 0.104 |
| 0.941 | 0.860 | 0.869 | 0.0997 | 0.110 | 0.104 |
| 0.500 | 0.430 | 0.421 | 0.0982 | 0.117 | 0.102 |
| 0.513 | 0.436 | 0.431 | 0.0958 | 0.0889 | 0.0998 |
| 0.528 | 0.432 | 0.442 | 0.0965 | 0.138 | 0.100 |
| 0.547 | 0.459 | 0.455 | 0.0922 | 0.103 | 0.0964 |
| 0.564 | 0.466 | 0.468 | 0.716 | 0.591 | 0.590 |
| 0.585 | 0.471 | 0.484 | 0.734 | 0.612 | 0.606 |
| 0.609 | 0.512 | 0.502 | 0.756 | 0.627 | 0.627 |
| 0.227 | 0.224 | 0.216 | 0.780 | 0.656 | 0.650 |
| 0.228 | 0.221 | 0.217 | 0.803 | 0.651 | 0.675 |
| 0.229 | 0.231 | 0.218 | 0.833 | 0.731 | 0.709 |
| 0.229 | 0.199 | 0.218 | 0.855 | 0.721 | 0.736 |
| 0.234 | 0.226 | 0.222 | | | |
| 0.235 | 0.221 | 0.223 | | | |
| 0.239 | 0.248 | 0.226 | | | |
| 0.386 | 0.343 | 0.339 | | | |
| 0.393 | 0.341 | 0.344 | | | |

Figure 4:
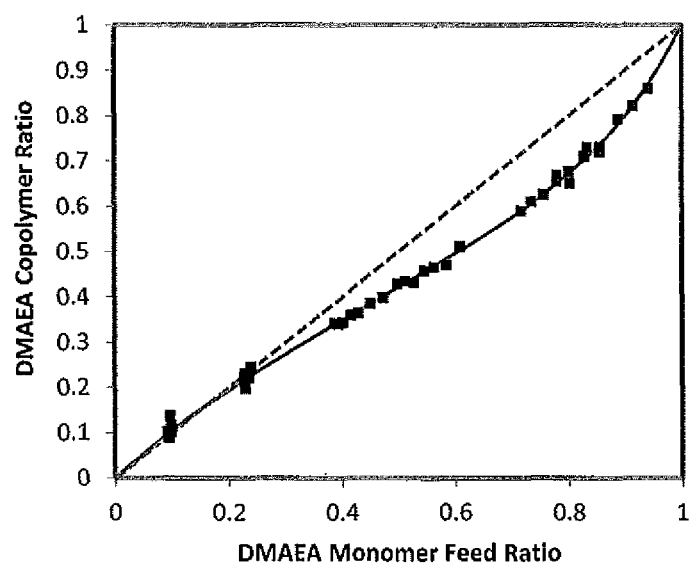
FIG. 4 shows the instantaneous copolymer composition plot of APM and DMAEA with reactivity ratios of 0.89 and 0.38, respectively.

Reactivity ratios for APM and DMAEA were determined using the Fineman-Ross method (0.86 and 0.38) and by a least-squares fitting of the copolymer equation (2) to the data shown in FIG. 4 (0.89 and 0.37). Similar values were found from the two treatments and the values are consistent with those measured for another methacrylamide-acrylate copolymer system: N-[3-(dimethylamino)propyl]methacrylamide/methyl acrylate (0.63/0.48).[31] The reactivity ratios obtained from fitting equation (2) were used to select the monomer feeds required to produce copolymers of the desired compositions.

$$F_1 = \frac{r_1 f_1^2 + f_1 f_2}{r_1 f_1^2 + 2 f_1 f_2 + r_2 f_2^2} \quad (2)$$

Conventional Radical Polymerization of APM and DMAEA:

A series of PAD copolymers of varying compositions were prepared by conventional radical copolymerizations of APM and DMAEA in water at pH 3 (Table 2).

TABLE 2

Properties of PAD copolymers.

| Polymer (target) | Feed Ratio (APM:DMAEA) | Polymer Composition[a] | $M_p$[b] (kDa) |
|---|---|---|---|
| PAD$_{100}$ | 0:100 | 0:100 | 197 |
| PAD$_{88}$ (85) | 10:90 | 12:88 | 204 |
| PAD$_{74}$ (75) | 15:85 | 26:74 | 211 |
| PAD$_{43}$ (50) | 50:50 | 57:43 | 239 |
| PAD$_{24}$ (25) | 75:25 | 76:24 | 270 |

[a]From $^1$H NMR analysis.
[b]Peak MW values estimated by GPC using PEG calibration.

Monomer feeds enriched with DMAEA were used when targeting PAD$_{85}$ and PAD$_{75}$ such that they would give the desired average copolymer compositions at 70% conversion. The polymers were purified by dialysis at pH 3 to avoid hydrolysis, and then isolated by freeze-drying. The isolated copolymers were analyzed by $^1$H NMR spectroscopy in D$_2$O. The compositions of the copolymers were determined using the areas of the DMAEA peak at 4.5 ppm (2H) and the backbone proton signals at 0.5-2.8 ppm (3H from DMAEA; 7H from APM). The measured copolymer compositions were close to the targeted average compositions as shown in Table 2, with the offset from comonomer feed ratios being in accordance with the reactivity ratios. The PAD$_{43}$ copolymer formed from the 50:50 feed ratio had a DMAEA content a bit lower than expected on the basis of the reactivity ratios (54% DMAEA at 70% conversion), perhaps due to uncertainty in the NMR analysis. In later experiments, PAD with 50 mol % DMAEA was obtained by employing a 45:55 feed ratio. It is important to note that little or no hydrolysis was observed during the copolymerization and purification process. In addition, NMR analysis of solid PAD samples stored for several months at room temperature revealed that PAD in the hydrochloride form was stable to hydrolysis and trans-amidation. Hence, the use of an acidic pH during copolymerization and purification was successful in preventing premature hydrolysis of DMAEA.

GPC analysis of PAD$_{100}$, PAD$_{88}$, PAD$_{74}$, PAD$_{43}$, and PAD$_{24}$ indicated that the polymers had high MWs and dispersities. Only $M_p$ values (MW at the peak maximum) are reported in Table 1 because these polymers contained high MW fractions that exceeded both the exclusion limits (~300 kDa) of the GPC columns, and the MW of the highest calibration standard used (584 kDa).

MW Control:

In an initial attempt to control MW, cysteamine (2-aminoethanethiol), a water-soluble thiol, was used as a chain transfer agent. While the use of cysteamine caused a reduction of copolymer MW, $^1$H NMR spectroscopy revealed the occurrence of a Michael addition of cysteamine to the acrylate group of DMAEA monomer units even though the pH was well below 7. The Michael addition is fairly rapid, and leads to significant fractions of the cysteamine, and in some cases DMAEA, being consumed within minutes after solution preparation. Although the Michael product should be easily removed by dialysis, this side reaction would cause an undesirable drift in both comonomer ratio and MW during the copolymerization. Thus, RAFT polymerization was investigated as an alternative method to control MW and polydispersity.

RAFT Polymerization:

RAFT copolymerization of APM and DMAEA has not yet been reported in the literature, though RAFT polymerizations of each of these monomers in other (co)polymer systems have previously been studied.[18,27,28,30-32] CTP has previously been used for RAFT (co)polymerizations separately involving APM and DMAEA and, thus, was chosen as the RAFT agent for the APM-DMAEA copolymerization. The stability and solubility of RAFT agents in aqueous solvents has been an issue, especially at extremes of pH, ionic strength, and temperature.[35-38] In the case of CTP, organic co-solvents have been used to improve solubility and CTP has been shown to be hydrolytically stable at pH 3-4,[39] which was also ideal for minimizing DMAEA hydrolysis. Thus, RAFT copolymerization of APM and DMAEA was carried out at 70° C. in a 2:1 (v:v) water:1,4-dioxane solvent mixture at pH 3-4 using CTP and V501 as the RAFT agent and initiator (FIG. 1). The high monomer concentration (30% w/v) also helped to solubilize the RAFT agent and initiator, as they were not very soluble in water at pH 3-4. The CTP:V501 ratio was always 1:0.2 as it allowed for control of the RAFT polymerization, while the monomer: CTP ratio was varied to obtain the PAD copolymers of 8 or 30 kDa. These MWs were selected to demonstrate the effect of MW on in-diffusion of the polycations into calcium alginate beads.

Figure 5:
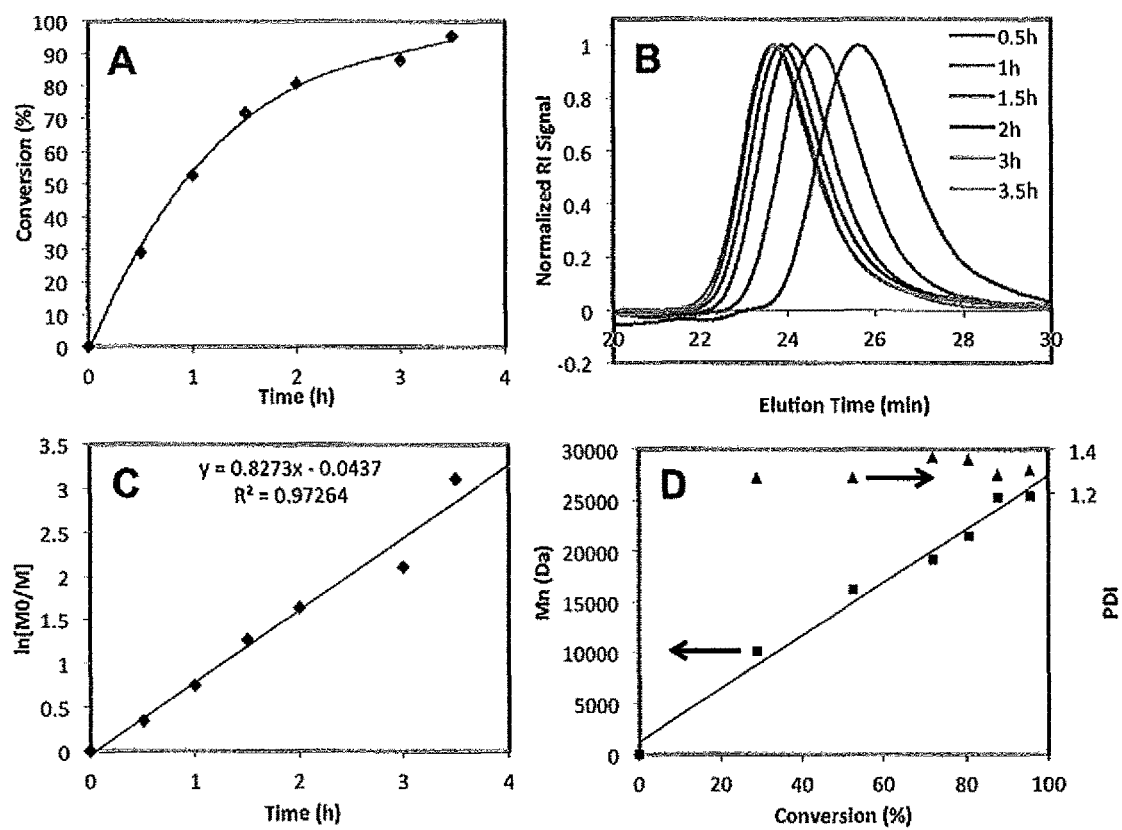
FIG. 5 shows representative results for the RAFT copolymerization to form $PAD_{75}$-30k. Conversion vs. time (A). GPC chromatograms of aliquots sampled from the copolymerization mixture (B). First-order kinetic plot (C). MW and PDI vs. conversion (D).

Studies were carried out to determine the rate of the RAFT copolymerizations and the ability to control MW and polydispersity. Reactions targeting $PAD_{25}$, $PAD_{50}$, and $PAD_{75}$ copolymers with MWs of 8 and 30 kDa were conducted and the progress of the copolymerizations was followed by $^1$H NMR and GPC analysis of aliquots sampled during the course of the reactions. Representative results for $PAD_{75}$-30k are shown in FIG. 5. The copolymerization went to high conversion, reaching 95% conversion after 3.5 h at 70° C. (FIG. 5A), showed linear $1^{st}$ order kinetics (FIG. 5C), linear growth of MW with conversion and low polydispersity (FIG. 5B/5D), characteristic features of a controlled radical polymerization. Similar results were obtained for $PAD_{75}$-8k, $PAD_{50}$ (8 and 30k), and $PAD_{25}$ (8 and 30k), indicating that the RAFT polymerization system was suitable for this copolymerization.

RAFT polymerization was used for larger-scale preparations of $PAD_{25}$, $PAD_{50}$, and $PAD_{75}$. MWs of 8 and 30 kDa were targeted by using monomer:CTP ratios of about 60:1 and 220:1, respectively, and stopping the polymerizations at about 80-85% conversion. Some details of the copolymerizations and the resulting copolymers are given in Table 3.

of these PAD copolymers as measured by GPC were lower than expected, which is likely due to a poor match between the high charge density PAD polycations and the PEG standards used for calibration. Determination of $M_n$ by analysis of the dithiobenzoate end group by $^1$H NMR and UV-vis spectroscopy resulted in values fairly close to targeted MWs. The PAD copolymers made by RAFT and conventional polymerization were used in the hydrolysis studies described below. In addition the PAD copolymers were used to coat calcium alginate beads and to explore the effects of PAD composition and MW on the nature and stability of the capsule shell.

Hydrolysis of PAD:

$^1$H NMR was used to follow hydrolysis. PAD in the protonated form was dissolved in buffered $D_2O$ (acetate, phosphate, or borate) and then the pH was adjusted to the desired pH before the first NMR spectrum was measured. The pH of the solutions were monitored during the hydrolysis experiments and buffers with concentrations equal to or greater than that of the monomer repeat units were used to minimize the pH drift (i.e., 50-100 mM buffer and 25-50 mM monomer units).

Figure 6:
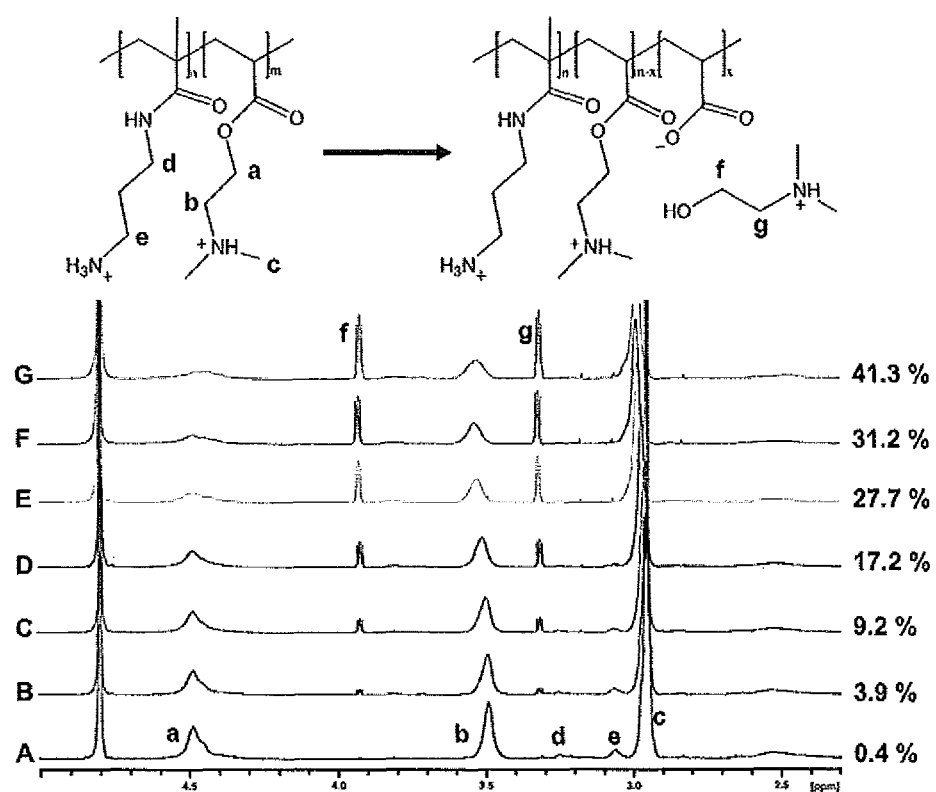
FIG. 6 illustrates $^1$H NMR spectra during hydrolysis of a 1% solution of PAD$_{88}$ in 50 mM phosphate-buffered D$_2$O (pH 7) at 37° C. over time (A-G) to show the change in the signals due to certain atomic nuclei (a-g).

Initial experiments looked at the hydrolysis of 1% solutions of the high MW samples of $PAD_{88}$, $PAD_{74}$, $PAD_{43}$, and $PAD_{24}$ at pH 7 in 50 mM phosphate-buffered $D_2O$ at 37° C. NMR spectra measured during hydrolysis of $PAD_{88}$ are shown in FIG. 6. The disappearance of the DMAEA side-chain peaks at 3.5 and 4.5 ppm and the appearance of sharp peaks due to the small molecule by-product DMAE at 3.3 and 3.9 ppm reveal the occurrence of hydrolysis.

Figure 7:
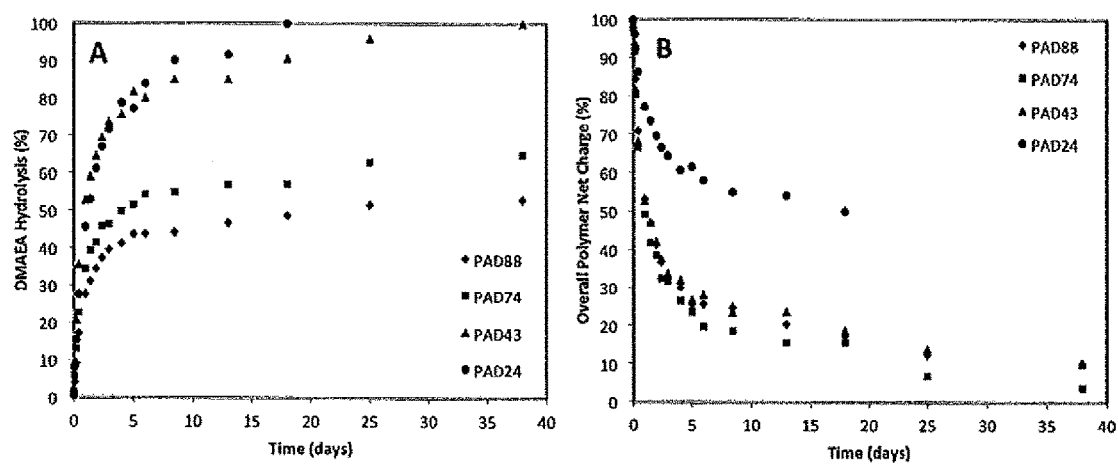
FIG. 7 shows the extent of hydrolysis of PAD$_{88}$, PAD$_{74}$, PAD$_{43}$ and PAD$_{24}$ at pH 7 and 37° C. shown as the percent of DMAEA hydrolyzed (A) and the overall net charge (B).

All four copolymers showed rapid initial hydrolysis that slowed after 2 or 3 days and each plot approached a distinct plateau that depended on the copolymer composition (FIG. 7A). The solutions had initial pH values of 6.8-6.9, which decreased during hydrolysis due to the production of anionic groups. After 38 days, the $PAD_{88}$ solution had exhibited the largest pH drift, falling from pH 6.80 to 6.03 with smaller decreases observed for $PAD_{74}$ (6.84 to 6.30), $PAD_{43}$ (6.90 to 6.60) and $PAD_{24}$ (6.85 to 6.60). While the drop in pH might account for some of the slowing of hydrolysis, it does not seem significant enough to have caused the dramatic slow-

TABLE 3

GPC, $^1$H NMR, and UV-vis data for PAD Synthesized by RAFT Polymerization.

| Polymer | [M]:[CTP]:[V501]$^a$ | % Conv.$^b$ | $M_{n,\,th}^c$ | $M_{n,\,NMR}^b$ | $M_{n,\,UV}^d$ | $M_{n,\,GPC}$(PDI)$^e$ | APM:DMAEA$^b$ |
|---|---|---|---|---|---|---|---|
| $PAD_{75}$-8k | 58:1:0.20 | 78 | 8.1 | 8.2 | 9.1 | 4.5 (1.31) | 25:75 |
| $PAD_{42}$-8k | 54:1:0.19 | 92 | 9.0 | 10.4 | 15.4 | 9.1 (1.36) | 58:42 |
| $PAD_{20}$-8k | 58:1:0.20 | 82 | 8.4 | 8.9 | 10.4 | 7.3 (1.39) | 80:20 |
| $PAD_{76}$-30k | 218:1:0.20 | 74 | 28.7 | 23.9 | 29.0 | 15.4 (1.19) | 24:76 |
| $PAD_{45}$-30k | 212:1:0.20 | 84 | 31.8 | 27.5 | 37.0 | 21.1 (1.28) | 55:45 |
| $PAD_{24}$-30k | 211:1:0.20 | 74 | 28.0 | 20.9 | 30.4 | 17.6 (1.35) | 76:24 |

$^a$Actual APM:DMAEA feed ratios of 15:85 for $PAD_{75}$-8k and $PAD_{76}$-30k; 52:48, 53:47, 76:24, and 77:23 for $PAD_{45}$-30k, $PAD_{42}$-8k, $PAD_{24}$-30k, and $PAD_{20}$-8k, respectively.
$^b$From $^1$H NMR analysis.
$^c$Theoretical $M_n$ (kg/mol) calculated using equation (1).
$^d M_n$ from dithiobenzoate end group analysis by UV-vis spectroscopy in MeOH.
$^e M_n$ (kg/mol) and PDI values were estimated by GPC analysis in 1M acetate, pH 4.8 buffer solvent using PEG calibration.

The monomer feed ratios were not adjusted for the differing reactivities except for PAD75 where a 15:85 APM: DMAEA feed was used. The compositions of the copolymers determined by $^1$H NMR spectroscopy were fairly close to the targeted compositions and, in accord with the reactivity ratios, showed a slight enrichment in APM compared to the feed. In living polymerizations, the differing reactivities of APM and DMAEA lead to compositional drifts within each copolymer chain, i.e., a gradient copolymer. The MWs ing of hydrolysis seen after a few days or the very different plateaus observed for the different PAD copolymers in FIG. 7A. In the case of $PAD_{24}$ with only 24 mol % DMAEA, hydrolysis goes to completion while $PAD_{88}$ plateaus near 50% hydrolysis. Hydrolysis leads to the formation of a polyampholyte (polymer-bound cationic and anionic groups) and both total and net cationic charges on the polymer chain decreases as hydrolysis progresses. This may result in reduced local hydroxide concentration, a change (collapse) in chain conformation, possibly creating a more hydrophobic local environment, and perhaps a reduced driving force for hydrolysis (fewer cation-cation interactions). It has also been suggested that ester units located between two hydrolyzed units (an AA-DMAEA-AA triad) might be stable to hydrolysis.[17] With $PAD_{24}$, the polymer still has a significant net cationic charge when hydrolysis is complete because of the 76% APM content. In contrast, the $PAD_{88}$ chains are approaching zero net charge when about 55% of the DMAEA units are hydrolyzed.

The hydrolysis data from FIG. 7A is replotted in terms of net polymer charge in FIG. 7B. Net charge, perhaps better termed % excess of cationic groups, was calculated from the fractions of cationic (APM+DMAEA) and anionic (AA) units. FIG. 7B shows that hydrolysis slows dramatically as the polymer chains approach zero net charge, which in the case of $PAD_{43}$ also corresponds to complete hydrolysis of the DMAEA units. It is interesting that even after nearly 6 weeks at 37° C. none of the systems in this particular experiment had crossed over the zero net charge line to produce chains with a net negative charge.

Figure 8:
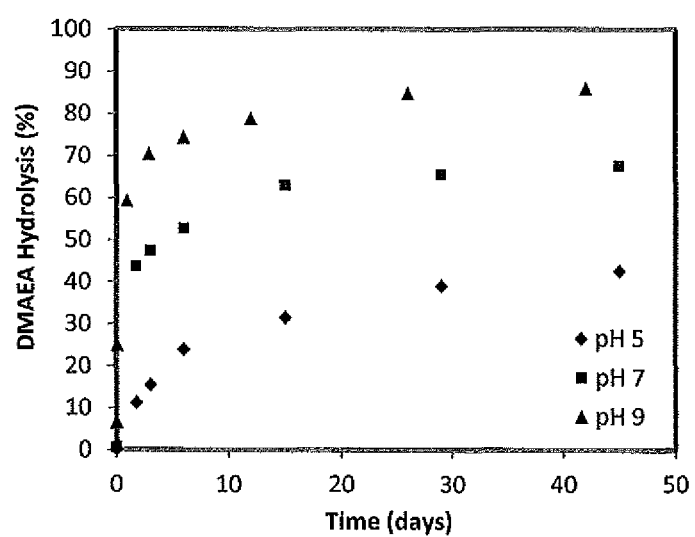
FIG. 8 shows extent of hydrolysis of PAD$_{88}$. in 100 mM buffer solutions at pH 5, 7 and 9 at 37° C.

Effect of pH on PAD Hydrolysis:

The effect of pH on hydrolysis of the DMAEA units of PAD was examined. To minimize pH drift during hydrolysis, the buffer concentrations were increased to 100 mM with acetate, phosphate and borate buffers used for pH 5, 7, and 9, respectively, and the concentration of $PAD_{88}$ was decreased to 0.5% w/v (cf. 1% in previous experiments) such that the initial concentration of DMAEA units was about 25 mM. $PAD_{88}$ was dissolved in the 100 mM buffer solution and then the pH was adjusted to the desired pH before the first $^1$H NMR spectra were recorded. The samples were maintained at 37° C. as in the previous experiment and the results are shown in FIG. 8. The pH was monitored during hydrolysis and remained fairly stable: initial pH values were 4.99, 6.94, and 9.20, and after 40-45 days, when 40-85% hydrolysis had occurred, the pH values were 4.94, 6.88, and 9.35, respectively. Thus, the buffer and substrate concentrations were suitable for preventing a significant pH drift during hydrolysis.

PAD hydrolysis is indeed pH-dependent with 15, 47 and 71% hydrolysis occurring at pH 5, 7 and 9, respectively, after 3 days at 37° C. At each pH, hydrolysis was more rapid initially but then slowed and approached a plateau with higher plateaus at higher pH. The experiments at pH 7 and 9 were repeated inside the NMR spectrometer at 37° C. allowing data points to be collected over the first hour of hydrolysis. The data showed reasonably linear first-order kinetic plots.

Ester groups in polymers such as poly(2-(dimethylamino) ethyl methacrylate)[44] or poly(2-aminoethyl methacrylate)[45] are typically more stable than the monomers or other small-molecule analogs because of steric hindrance and a hydrophobic local environment that hinder hydrolysis. This suggests that the environment around the ester units in DMAEA polymers is, at least initially, less hindered and less hydrophobic than in the methacrylates. However, as polymer hydrolysis progresses, the DMAEA units in the polymer hydrolyze much more slowly than the small-molecule analogs indicating that there is a dramatic change in the local environment (e.g., reduced cation-cation repulsion, reduced local hydroxide concentration, increased hydrophobicity). The pH dependent hydrolysis of PAD is consistent with studies of small-molecule analogs and TMAEA-containing polymers.

The $PAD_{88}$ hydrolysis at pH 7 presented in FIG. 7A was slower, and reached a lower plateau than seen in FIG. 8, because the pH drifted down to 6.1 over the course of the hydrolysis. When the pH was more stable, hydrolysis continued past the point of zero net charge to give a polymer with a net anionic charge. After 45 days at pH 7, when 67.7% of the initial DMAEA units had been hydrolyzed (FIG. 8), the polymer consisted of about 60% anionic AA units and 40% cationic units (APM+DMAEA). The $PAD_{88}$ solution turned slightly cloudy as it reached zero net charge, typical behavior for a polyampholyte near its isoelectric point. The solution cleared again as hydrolysis continued and the polymer gained a net anionic charge.

Figure 9:
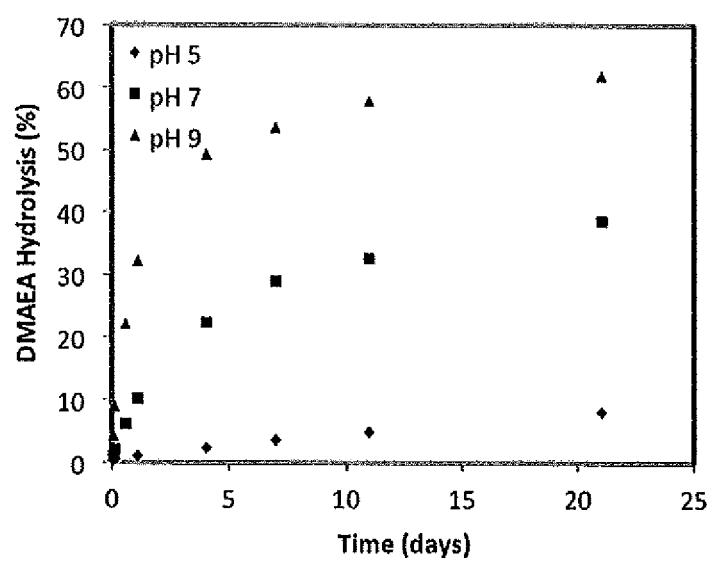
FIG. 9 shows extent of hydrolysis of pDMAEA in 100 mM buffer solutions at pH 5, 7 and 9 at room temperature (22° C.).

To allow a better comparison with literature data, hydrolysis of the pDMAEA homopolymer ($PAD_{100}$) was examined at room temperature in the pH 5, 7 and 9 buffers (FIG. 9). The pH of pDMAEA solutions were stable throughout the experiment: 5.05, 7.02, and 9.32 initially, and 5.09, 6.94, and 9.35, respectively, after 21 days of hydrolysis. Not surprisingly, hydrolysis was slower at room temperature (22° C.) than had been seen for $PAD_{88}$ at 37° C. pDMAEA hydrolysis showed a marked pH dependence with nearly 50% hydrolysis after 4 days at pH 9 but only 22 and 2% at pH 7 and 5, respectively. The curve obtained for pDMAEA in pH 9 buffer is similar to that obtained in other studies of pDMAEA (free-base form) dissolved in water.[18,19,27] Thus, as observed for small-molecule analogs, PAD and TMAEA-containing copolymers, the rate of pDMAEA hydrolysis decreases significantly as the pH is decreased.

Effect of Ionic Strength on PAD Hydrolysis:

If electrostatic interactions play an important role in hydrolysis, varying the ionic strength may affect the rate and extent of hydrolysis. $PAD_{88}$ was selected for study since it could shift its net-charge from cationic to anionic, and ionic strengths up to 500 mM NaCl were used. Increased ionic strength did not have a dramatic effect on the rate or extent of hydrolysis. In the presence of 500 mM NaCl, the initial rate of hydrolysis was slightly slower, however, the effect was small and all of the systems showed a similar plateau. After about 10 days, the systems with added NaCl showed a slightly higher extent of hydrolysis than the sample with no added NaCl. While these changes are consistent with some weakening of electrostatic interactions, the hydrolysis still slows dramatically as $PAD_{88}$ approaches zero net charge (57% hydrolysis).

In summary, the PAD copolymers showed complex hydrolytic behavior with rapid initial hydrolysis that slowed dramatically as the net charge on the polymer chains decreased. The composition of the PAD copolymers had a pronounced effect on the rate and/or extent of DMAEA hydrolysis observed with more rapid and complete hydrolysis seen for APM-rich copolymers because the chains had net positive charge throughout the hydrolysis. The rate of PAD and pDMAEA hydrolysis depends on pH.

PAD-Coated Alginate Capsules:

The PAD copolymers were investigated as coating materials for alginate-based capsules to determine the effects of PAD MW and composition on the shell structure. In addition, experiments were conducted to determine if the PAD-coatings on the capsules could be covalently crosslinked to probe the effect of APM content on the efficiency of crosslinking. Finally, PAD-coated capsules were examined for evidence that DMAEA hydrolysis occurred to give a capsule surface with reduced cationic charge for potentially improved biocompatibility.

Figure 14:
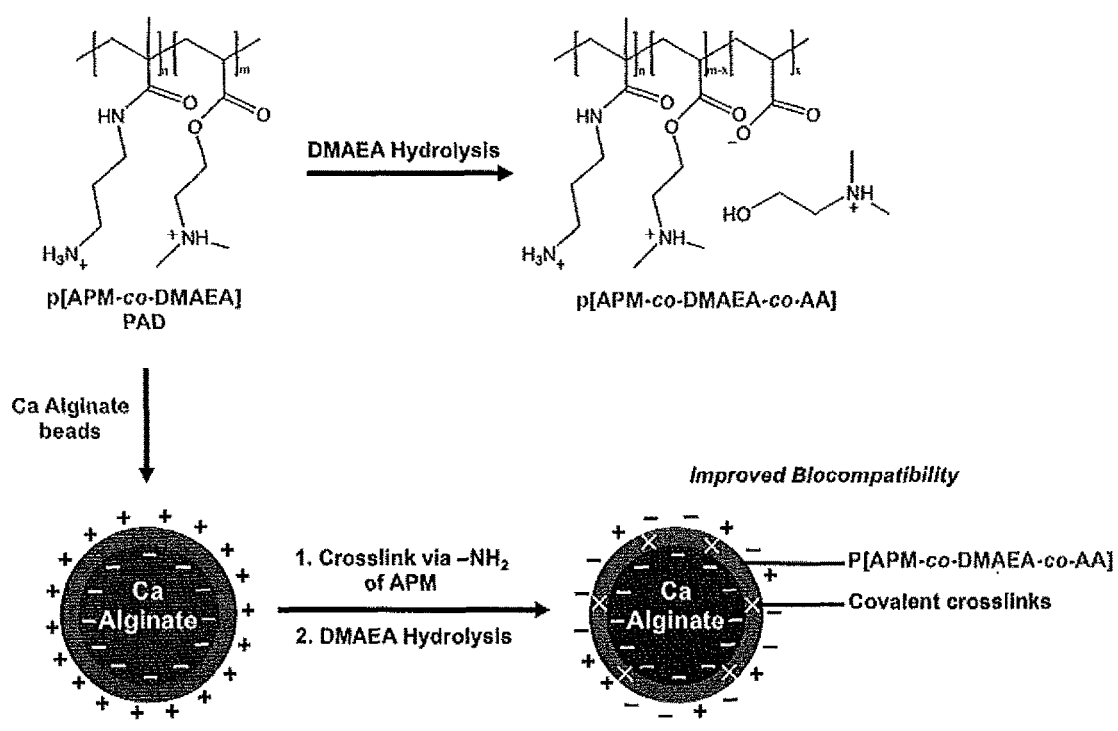
FIG. 14 illustrates the scheme for coating calcium alginate beads with [APM-co-DMAEA], PAD, to improve biocompatibility.

Initially, PAD copolymers are high charge density polycations making them useful in forming polyelectrolyte complexes, e.g., in coating anionic calcium alginate beads. Hydrolysis of DMAEA units would cause a reduction of cationic charge, and perhaps even a shift to net anionic charge, and as such, the polyelectrolyte complex would be expected to dissociate, unless they were covalently cross-linked. Thus, calcium alginate beads were coated with PAD copolymers (8 and 25 kDa) as shown in FIG. 14, and then maintained at pH 7 where, if PAD hydrolysis occurred, the capsules were expected to disassemble in the absence of crosslinking.

The capsules were examined by conventional bright field and fluorescence microscopy just after coating with 8 and 30 kDa PAD-f copolymers. As expected, the high charge density polycations bound to the anionic calcium alginate hydrogel, but the capsule surface became wrinkled for PAD with ~25% DMAEA, and to a lesser extent 50% DMAEA. Surface wrinkling indicates strong binding to the surface to give a coating that is unable to restructure itself when the core of the hydrogel shrinks due to changes in osmotic pressure. In addition, the fluorescence images of the capsules coated with $PAD_{75}$ were brighter than those coated with $PAD_{50}$ or $PAD_{25}$ consistent with the binding of greater amounts of polycation.

Figure 10:
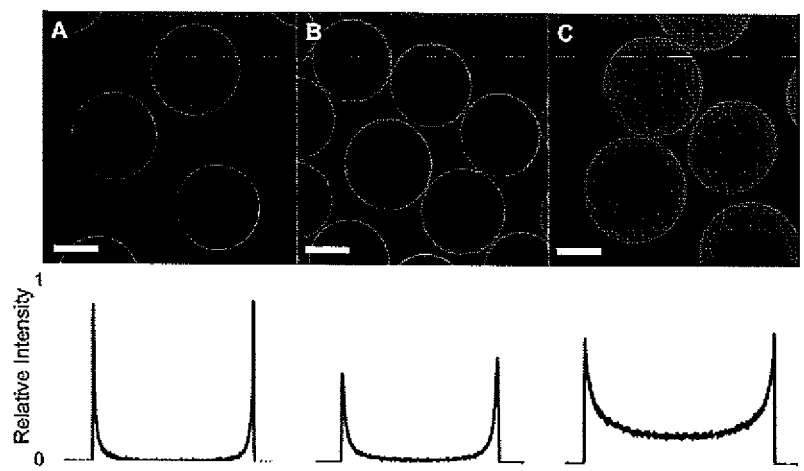
FIG. 10 shows CLSM images of calcium alginate capsules coated with PAD$_{20}$-8kf (A), PAD$_{42}$-8kf (B), and PAD$_{75}$-8kf (C) with the corresponding representative line profiles. Scale bars are 250 μm.
Figure 11:
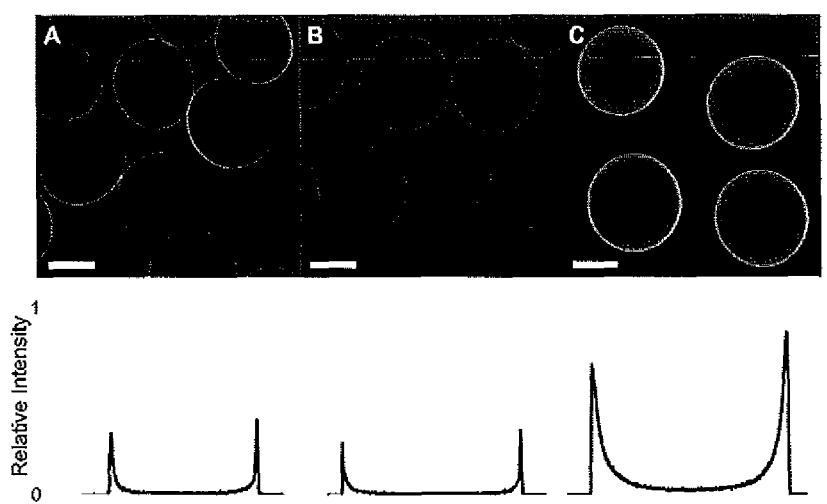
FIG. 11 shows CLSM images of calcium alginate capsules coated with PAD$_{24}$-30kf (A), PAD$_{45}$-30kf (B), and PAD$_{76}$-30kf (C) with the corresponding representative line profiles. Scale bars are 250 μm.

CLSM images of the calcium alginate capsules just after coating with 8 and 30 kDa PAD-f copolymers are shown in FIGS. 10 and 11, respectively. As seen by conventional microscopy, there were distinct differences in the nature of the shell formed depending on the copolymer composition. The APM-rich $PAD_{20}$-8k and $PAD_{24}$-30k copolymers were restricted to the surface of the beads (FIGS. 10A and 11A) giving very thin shells (5.2±2.5 and 8.5±3.0 μm) for both MWs. The higher MW $PAD_{45}$-30k was restricted to the surface (FIG. 11B; 3.8±0.8 μm) but the lower MW $PAD_{42}$-8k was able to diffuse more deeply into the hydrogel bead (FIG. 10B) to form a thicker membrane (11.6±1.3 μm). The DMAEA-rich $PAD_{75}$-8k and $PAD_{76}$-30k copolymers were best able to diffuse into the calcium alginate hydrogel, which led to a greater amount of these copolymers being bound to the beads as indicated by the area under the line profiles. A significant fraction of the smaller $PAD_{75}$-8k reached the core of the bead (FIG. 10C). The larger $PAD_{76}$-30k was more limited to the surface region of the bead but gave a thicker membrane (21.5±2.9 μm) than seen with the other copolymers.

These results demonstrate that it possible to control characteristics of the capsule shell such as thickness, and, likely, stiffness and permeability, through the MW and composition of the PAD copolymers. For strength and cytocompatibility reasons, it is probably best to have the polycation mainly at the capsule surface but not get a shell that is too thin and weak to resist mechanical and osmotic stresses. PAD copolymers rich in DMAEA were of interest as they have the most potential for charge-shifting of the capsule surface. As the lower MW $PAD_{75}$-8k diffused throughout the hydrogel, calcium alginate beads coated with higher MW $PAD_{76}$-30k were the focus of further experiments. Capsules with similar distributions of $PAD_{50}$ or $PAD_{25}$ could probably be obtained by using polymers with MWs less than 8 kDa that were able to diffuse deeper into the calcium alginate bead.

Figure 12:
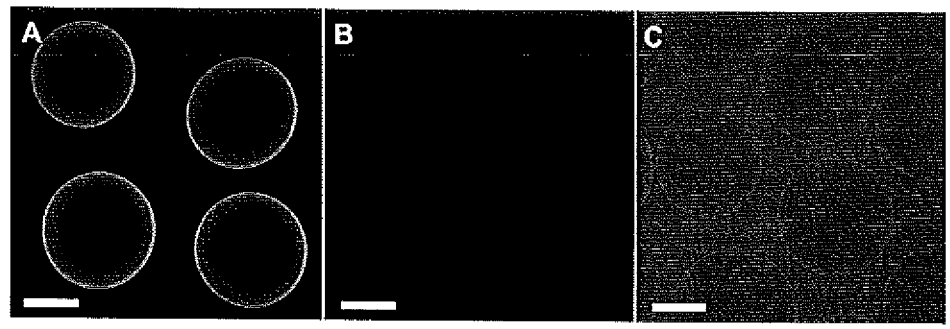
FIG. 12 shows CLSM images of PAD$_{76}$-30k-f-coated capsules as formed (A), and after 9 days at pH 7.8 and room temperature taken with the same microscope settings (B), and with increased detector gain (C). Scale bars are 250 μm.

Hydrolysis of the PAD Coating:

It was expected that hydrolysis of PAD would cause it to dissociate from the capsule as the electrostatic interactions weakened. FIG. 12 shows CLSM images of $PAD_{76}$-30k coated calcium alginate beads as formed (FIG. 12A) and after 9 days storage in a pH 7.8 buffer at room temperature in the dark (FIG. 12B and C). The capsule coating is no longer clearly visible when imaged with the same detector gain settings (FIG. 12B) and when imaged with increased detector gain, fluorescence is seen throughout the supernatant with slightly higher intensity at the capsule surface. This indicates that nearly all of the PAD-f has dissociated from the surface, consistent with PAD hydrolysis leading to a loss of electrostatic binding. About 30-40% of the DMAEA groups would have been hydrolyzed assuming that hydrolysis occurs at a similar rate in the polyelectrolyte complex as the free polymer in solution. This would result in a polymer that was still cationic with about 20-30% of the monomer units converted to AA.

Covalent Cross-Linking of PAD Coated Capsules with THPC:

While hydrolysis may lead to improved biocompatibility, it also causes weakening of the electrostatic interactions binding the PAD copolymers to the calcium alginate hydrogel, and, hence, introducing covalent crosslinks into the membrane complex once formed would be desirable. APM was incorporated into PAD because the primary amines are good sites for crosslinking by reaction with electrophilic polymers or small molecules to enhance the mechanical strength of the capsule. In this work, the crosslinking agent selected was THPC, which was shown to be a cyto compatible crosslinking agent for encapsulation of stem and neuronal cells in hydrogels made from elastin-like proteins.[21]

Figure 13:
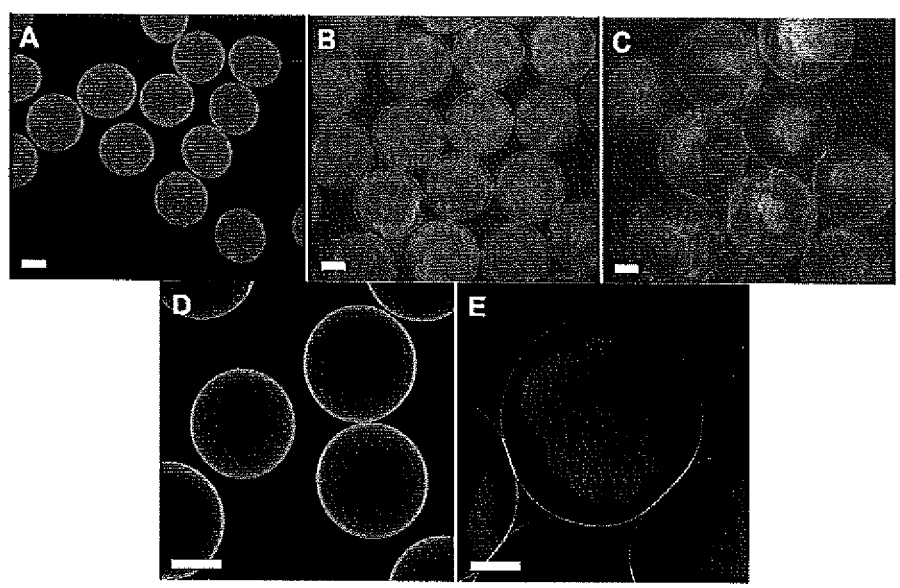
FIG. 13 shows fluorescence microscopy images of PAD$_{76}$-30k-f-coated capsules after crosslinking with THPC: as formed (A), after 10 min in 50 mM citrate (B), and after an additional 10 min in 0.1 M NaOH (C). Also shown are CLSM images of capsules as formed (D) and after treatment with citrate and NaOH (E). Scale bars are 250 μm.

As a proof of concept, calcium alginate beads coated with $PAD_{76}$-30k-f were exposed briefly to a 0.1% THPC solution. If all of the $PAD_{76}$ had been bound to the capsules in the coating step, this would be a 3-fold molar excess of THPC and an even greater excess of potential reaction sites since each THPC molecule can react with up to four amines. It was assumed that only a fraction of the THPC molecules would become bound to PAD during the brief exposure and that these groups would continue to react after the excess THPC was removed. To demonstrate that the capsule membrane had been covalently cross-linked, the capsules were treated with citrate (50 mM) to liquefy the calcium alginate core, and then 0.1 M NaOH to neutralize the ammonium ions of PAD and disrupt the electrostatic interaction holding the shell together. As shown in FIG. 13, the THPC-treated capsules (FIG. 13A) swelled when exposed to citrate (FIG. 13B) and, while a few capsules tore open from mechanical agitation or osmotic stress, most remained intact. After addition of NaOH and 10 min of gentle agitation, the capsule shell survived either as part of a whole capsule or as shell fragments (FIG. 13C). In contrast, capsules that had not been crosslinked with THPC swelled when treated with citrate and then dissolved when NaOH was added.

CLSM images taken of the capsules just after crosslinking (FIG. 13D) revealed that THPC treatment had not affected the polymer distribution as it was similar to that seen in capsules formed without crosslinking (FIG. 12A). CLSM images of the capsules after citrate and NaOH exposure revealed that a thin outer-shell appeared to have pulled away from a more diffuse inner region (FIG. 13E). The inner region, which was also visible in the conventional fluorescence microscopy image (FIG. 13C), may be a very lightly crosslinked gel or viscous liquid formed from $PAD_{76}$ that diffused further into the calcium alginate bead. The lower PAD concentration below the capsule surface (see FIG. 11C, line profile) would make crosslinking less efficient. These results demonstrate that it was possible to cross-link the PAD coating on the capsules with THPC, which would increase the long-term mechanical strength of the capsule by preventing loss of PAD when hydrolysis generates a lower charge density surface.

In summary, the development of a set of novel charge-shifting polycations is described herein. The copolymers have high cationic charge initially, allowing ready formation of polyelectrolyte complexes with anionic polymers or surfaces (e.g. hydrogel), but subsequently undergo hydrolysis that reduces the cationic charge. The polymers bear primary amino groups that allow easy crosslinking and functionalization. In one embodiment, APM and DMAEA, which were found to have reactivity ratios of 0.89 and 0.37, respectively, were copolymerized by conventional radical and RAFT polymerization to generate a series of PAD copolymers of varying composition and MWs. Hydrolysis of DMAEA groups within PAD copolymers became progressively slower and approached plateaus as the cationic charge on the polymers was reduced. The studies revealed significant dependence of rate and degree of DMAEA hydrolysis on copolymer composition and pH. APM-rich PAD copolymers bound more strongly to calcium alginate beads, resulting in thin shells, likely due to stronger interactions between the primary ammonium ions of APM cf. the tertiary ammonium ions of DMAEA. Higher MW PAD copolymers gave thinner shells than lower MW PAD due to the restricted diffusion of the larger polymer. Hydrolysis also occurred for PAD that was part of a polyelectrolyte complex, in this case $PAD_{76}$-30k-f that bound to calcium alginate capsules, leading to loss of non-crosslinked PAD coating. The PAD coating on the capsules could be crosslinked with THPC to generate a strong capsule shell with low charge density and good biocompatibility.

Relevant portions of references referred to herein are incorporated by reference.

REFERENCES

1. Decher, G.; Hong, J. D.; Schmitt, J. *Thin Solid Films* 1992, 210/211, 831-835.
2. Peyratout, C. S.; Dähme, L. *Angew. Chem. Int. Ed.* 2004, 43, 3762-3783.
3. Lim, F.; Sun, A. M. *Science* 1980, 210, 908-909.
4. Thu, B.; P. Bruheim, P.; T. Espevik, T.; O. Smidsrød, O.; P. Soon-Shiong, P.; G. Skjåk-Bræk, G. *Biomaterials* 1996, 17, 1031-1040.
5. Rokstad, A. M.; Donati, I.; Borgognaç, M.; Oberholzer, J.; Strand, B. L.; Espevik, T.; Skjåk-Bræk, G. *Biomaterials* 2006, 27, 4726-4737.
6. Tam, S. K.; Bilodeau, S.; Dusseault, J.; Langlois, G.; Hallé, J. P.; Yahia, J. H. *Acta Biomater.* 2011, 7, 1683-1692.
7. Gardner, C. M.; Potter, M. A.; Stöver, H. D. H. *J. Mater. Sci. Mater. Med.* 2012, 23, 181-193.
8. Gardner, C. M.; Stöver, H. D. H. *Macromolecules* 2011, 44, 7115-7123.
9. Kleinberger, R. M.; Stöver, H. D. H. In Progress.
10. Dubey, A.; Burke, N. A. D.; Stöver, H. D. H. *J. Polym. Sci. A: Polym. Chem.* 2015, 53, 353-365.
11. Wilson, J. T.; Cui, W.; Kozlovskaya, V.; Kharlampieva, E.; Pan, D.; Qu, Z.; Krishnamurthy, V. R.; Mets, J.; Kumar, V.; Wen, J.; Song, Y.; Tsukruk, V. V.; Chaikof, E. L. *J. Am. Chem. Soc.* 2011, 133, 7054-7064.
12. Sawhney, A. S.; Hubbell, J. A. *Biomaterials* 1992, 13, 863-870.
13. Wang, Y. *J. Mater. Sci. Eng. C* 2000, 13, 59-63.
14. Liu, X.; Yang, J. W.; Miller, A. D.; Nack, E. A.; Lynn, D. M. *Macromolecules* 2005, 38, 7907-7914.
15. Zhang, J.; Lynn, D. M. *Adv. Mater.* 2007, 19, 4218-4223.
16. Sinclair, A.; Bai, T.; Carr, L. R.; Ella-Menye, J. R.; Zhang, L.; Jiang, S. *Biomacromolecules* 2013, 14, 1587-1593.
17. McCool, M. B.; Senogles, E. *Eur. Polym. J.* 1989, 25, 857-860.
18. Truong, N. P.; Jia, Z.; Burges, M.; McMillan, N. A. J.; Monteiro, M. J. *Biomacromolecules* 2011, 12, 1876-1882.
19. Tran, N. T. D.; Truong, N. P.; Gu, W.; Jia, Z.; Cooper, M. A.; Monteiro, M. J. *Biomacromolecules* 2013, 14, 495-502,
20. Tran, N. T. D.; Jia, Z.; Truong, N. P.; Cooper, M. A.; Monteiro, M. J. *Biomacromolecules* 2013, 14, 3463-3471.
21. Chung, C.; Lampe, K. J.; Heilshorn, S. C. *Biomacromolecules* 2012, 13, 3912-3916.
22. Ma, X.; Vacek, I.; Sun, A. M. *Artif. Cells, Blood Substitutes, Immobilization Biotechnol.* 1994, 22, 43-69.
23. Chiefari, J.; Chong, Y. K.; Ercole, F.; Krstina, J.; Jeffery, J.; Le, T. P. T.; Mayadunne, R. T. A.; Meijs, G. F.; Moad, C. L.; Moad, G.; Rizzardo, E.; Thang, S. H. *Macromolecules* 1998, 31, 5559-5562.
24. Moad, G.; Rizzardo, E.; Thang, S. H. *Aust. J. Chem.* 2005, 58, 379-410.
25. Fineman, M.; Ross, S. D. *J Polynt. Sci.* 1950, 5, 259-262.
26. Kleinberger, R. M.; Burke, N. A. D.; Dalnoki-Veress, K.; Stöver, H. D. H. *Mater. Sci. Eng. C* 2013, 33, 4295-4304.
27. Cotanda, P.; Wright, D. B.; Tyler, M.; O'Reilly, R. K. *J. Polym. Sci. A: Polym. Ghent.* 2013, 51, 3333-3338.
28. Boyer, C.; Whittaker, M. R.; Chuah, K.; Liu, J.; Davis, T. P. *Langmuir* 2010, 26, 2721-2730.
29. Truong, N. P.; Gu, W.; Prasadam, I.; Jia, Z.; Crawford, R.; Xiao, Y.; Monteiro, M. J. *Nat. Commun.* 2013, 4:1902 doi: 10.1038/ncomms2905.
30. Aguilar, M. R.; Gallardo, A.; Fernandez, M. D.; Roman, J. S. *Macromolecules* 2002, 35, 2036-2041.
31. Si, K.; Qiu, K. Y. *J. Macromol. Sci.* 1995, A32, 1139-1148.
32. Deng, Z.; Bouchékif, H.; Babooram, K.; Housni, A.; Choytun, N.; Narain, R. *J. Polym. Sci. A: Polym. Chem.* 2009, 46, 4984-4996.
33. York, A. W.; Zhang, Y; Holley, A. C.; Guo, Y.; Huang, F.; McCormick, C. L. *Biomacromolecules* 2009, 10, 936-943.
34. Mendonça, P. V.; Serra, A. C.; Popov, A. V.; Guliashvili, T.; Coelho, J. F. J. *React. Fund. Polym.* 2014, 81, 1-7.
35. Thomas, D. B.; Convertine, A. J.; Hester, R. D.; Lowe, A. B.; McCormick, C. L. *Macromolecules* 2004, 37, 1735-1741.
36. Lowe, A. B.; McCormick, C. L. *Ace. Chem. Res.* 2004, 37, 312-325
37. Mertoglu, M.; Laschewsky, A.; Skrabania, K.; Wieland, C. *Macromolecules* 2005, 38, 3601-3614.
38. Albertin, L.; Stenzel, M. H.; Banner-Kowollik, C.; Davis, T. P. *Polymer* 2006, 47, 1011-1019.
39. Liu, G.; Shi, H.; Cui, Y.; Tong, J.; Zhao, Y.; Wang, D.; Cai, Y. *Polym. Chem.* 2013, 4, 1176-1182.
40. Ho, H. T.; Pascual, S.; Montembault, V.; Casse, N.; Fontaine, L. *Polym. Chem.* 2014, 5, 5542-5545.
41. Saveyn, H.; Hendrickx, P. M. S.; Dentel, S. K.; Martins, J. C.; Van der Meeren, P. *Water Res.* 2008, 42, 2718-2728.
42. Aksberg, R.; Wågberg, L. *J. Appl. Polym. Sci.* 1989, 38, 297-304.
43. Zhao, W.; Fonsny, P.; FitzGerald, P.; Warr, G. G.; Perrier, S. *Polym. Chem.* 2013, 4, 2140-2150.
44. van de Wetering, P.; Zuidam, N. J.; van Steenbergen, M. J.; van der Houwen, O. A. G. J.; Underberg, W. J. M.; Hennink, W. E. *Macromolecules* 1998, 31, 8063-8068.

45. Thompson, K. L.; Read, E. S.; Armes, S. P. *Polym. Degrad. Stab.* 2008, 93, 1460-1466.
46. Zhao, J.; Burke, N. A. D.; Stöver, H. D. H. unpublished results.
47. Bysell, H.; Malmsten, M. *Langmuir* 2006, 22, 5476-5484.
48. Bysell, H.; Hansson, P.; Malmsten, M. *J. Colloid Interface Sci.* 2008, 323, 60-69.
49. Strand, B. L.; Mørch, Y. A., Espevik, T.; Skjåk-Bræk, G, *Biotechnol. Bioeng* 2003, 82, 386-394.
50. Mazumder, M. A. J.; Shen, F.; Burke, N. A. D.; Potter, M. A.; Stöver, H. D. H. *Biomacromolecules* 2008, 9, 2292-2300.

The invention claimed is:

1. A charge-shifting copolymer comprising a first charge-shifting monomer that is cationic under physiological conditions and which possesses cationic groups that may be converted into anionic groups under physiological conditions, said first charge shifting monomer being selected from the group consisting of 2-(N,N-dimethylamino)ethyl acrylate (DMAEA), 2-(N,N-diethylamino)ethyl acrylate (DEAEA), 3-(N,N-diethylamino)propyl acrylate (DMAPA), and 3-(N,N-dimethylamino)propyl thiomethacrylate; a second monomer comprising at least one primary amine that is not convertible to an anionic group under physiological conditions selected from the group consisting of acrylamide, methacrylamide or methacrylate monomers bearing a primary amine group, and optionally, one or more monomers which are polar uncharged monomers, wherein the charge-shifting copolymer has a net neutral or net anionic charge.

2. The copolymer of claim 1, wherein the second monomer is selected from the group consisting of 3-aminopropylmethacrylamide (APM), 3-aminopropylacrylamide (APA), 2-aminoethylmethacrylamide (AEM), 2-aminoethylacrylamide (AEA), 4-aminobutylacrylamide (ABA), 3-aminopropyl methacrylate and 2-aminoethylmethacrylate.

3. The copolymer of claim 1, wherein the polar uncharged monomers are selected from the group consisting of acrylamide, N,N-dimethylacrylamide (DMA), N-(2-hydroxyethyl)acrylamide (HEA), N-(2-hydroxypropyl)methacryl amide (HPM), 3-amino-2-hydroxypropyl-methacrylate, glycerol methacrylate and poly(ethylene glycol) methacrylate.

4. The copolymer of claim 1, wherein the cationic groups of the first monomer are converted to anionic groups by hydrolysis under physiological conditions.

5. The copolymer of claim 1, comprising between about 10 to 95 mol % of the first charge-shifting monomer.

6. The copolymer of claim 1, having a molecular weight in the range of about 5-100 kDa.

7. The copolymer of claim 1, which is hydrolyzed.

8. A hydrogel system comprising a hydrogel core and the charge-shifting copolymer of claim 1 surrounding and/or dispersed within the hydrogel core.

9. The hydrogel system of claim 8, wherein the hydrogel is selected from the group consisting of alginate, agarose, high viscosity gel-forming polymers and combinations thereof.

10. The hydrogel system of claim 8, wherein the charge-shifting copolymer is hydrolyzed.

11. A method of making an immunocompatible hydrogel system comprising the steps of:
    i) exposing a hydrogel to an aqueous solution comprising the charge-shifting copolymer of claim 1; and
    ii) exposing the hydrogel to conditions that result in conversion of the cationic groups on the first monomer to anionic groups.

12. The method of claim 11, additionally comprising the step of cross-linking the copolymer to the hydrogel.

13. The method of claim 12, wherein a cross-linking agent selected from the group consisting of electrophilic polymers, tetrakishydroxymethyl phosphonium chloride (THPC), glutaraldehyde, and genipin is used for the crosslinking.

* * * * *